United States Patent
Danning

(10) Patent No.: US 9,010,041 B2
(45) Date of Patent: Apr. 21, 2015

(54) LEVELER FOR SOLAR MODULE ARRAY

(75) Inventor: Matthew G. Danning, Oakland, CA (US)

(73) Assignee: Sunpower Corporation, San Jose, CA (US)

( * ) Notice: Subject to any disclaimer, the term of this patent is extended or adjusted under 35 U.S.C. 154(b) by 96 days.

(21) Appl. No.: 13/532,728

(22) Filed: Jun. 25, 2012

(65) Prior Publication Data

US 2013/0340358 A1 Dec. 26, 2013

(51) Int. Cl.
*E04D 13/18* (2014.01)
*B23P 11/00* (2006.01)
*F16B 5/00* (2006.01)
*F16B 5/02* (2006.01)
*H01L 31/042* (2014.01)
*H02S 20/23* (2014.01)
*F16B 33/00* (2006.01)

(52) U.S. Cl.
CPC ............... *B23P 11/00* (2013.01); *F16B 5/004* (2013.01); *F16B 5/0233* (2013.01); *F16B 33/002* (2013.01); *H02S 20/00* (2013.01); *H02S 20/23* (2014.01); *Y02B 10/12* (2013.01); *Y02E 10/50* (2013.01); *Y10T 29/49826* (2015.01)

(58) Field of Classification Search
CPC ............ E04F 15/020464; E04D 11/007; F24J 2/5211; F24J 2/5245; F24J 2/5258; F24J 2/5264; H02S 20/00
USPC ............ 52/122.1, 126.1, 126.5–126.7, 173.3; 248/188.1, 188.3, 188.4, 188.5; 136/244

See application file for complete search history.

(56) References Cited

U.S. PATENT DOCUMENTS

| | | | | | |
|---|---|---|---|---|---|
| 4,558,544 | A | * | 12/1985 | Albrecht et al. | 52/126.6 |
| 5,333,423 | A | * | 8/1994 | Propst | 52/126.6 |
| 5,479,745 | A | * | 1/1996 | Kawai et al. | 52/126.6 |
| 5,862,635 | A | | 1/1999 | Linse et al. | |
| 6,024,330 | A | * | 2/2000 | Mroz et al. | 248/188.4 |
| 6,360,491 | B1 | * | 3/2002 | Ullman | 52/22 |
| 6,442,906 | B1 | * | 9/2002 | Hwang | 52/126.6 |
| 6,772,564 | B2 | * | 8/2004 | Leon | 52/126.5 |
| 6,902,140 | B1 | * | 6/2005 | Huang | 248/188.4 |
| 6,983,570 | B2 | * | 1/2006 | Mead | 52/263 |
| 7,001,098 | B2 | * | 2/2006 | Lin et al. | 403/408.1 |

(Continued)

FOREIGN PATENT DOCUMENTS

| | | |
|---|---|---|
| JP | 2004-060358 | 2/2004 |
| JP | 2004-300865 | 10/2004 |

(Continued)

OTHER PUBLICATIONS

International Search Report and Written Opinion of the International Searching Authority, PCT Appl. No. PCT/US2013/046994 (dated Sep. 2, 2013), 14 pages.

(Continued)

*Primary Examiner* — Mark Wendell
(74) *Attorney, Agent, or Firm* — Knobbe, Martens, Olson & Bear LLP

(57) ABSTRACT

A leveler for a solar module can include a base, a rotatable adjuster, and a follower. The rotatable adjuster can be mounted to the base with a swaging process, or other techniques. The follower can be embedded within a coupler configured to be connectable to solar modules. Turning the rotatable height adjuster changes the relative spacing between the solar module and the base.

12 Claims, 14 Drawing Sheets

(56) References Cited

U.S. PATENT DOCUMENTS

| | | | |
|---|---|---|---|
| 7,210,557 B2 * | 5/2007 | Phillips et al. | 181/207 |
| 7,406,800 B2 | 8/2008 | Cinnamon et al. | |
| 7,592,537 B1 | 9/2009 | West | |
| 7,744,050 B2 * | 6/2010 | de Toledo et al. | 248/188.3 |
| 7,748,175 B2 | 7/2010 | Liebendorfer | |
| 7,832,157 B2 | 11/2010 | Cinnamon | |
| 7,866,098 B2 | 1/2011 | Cinnamon | |
| 7,987,641 B2 | 8/2011 | Cinnamon | |
| 8,109,048 B2 | 2/2012 | West et al. | |
| 8,181,399 B2 * | 5/2012 | Knight et al. | 52/126.6 |
| 8,328,149 B2 * | 12/2012 | McLaughlin | 248/188.4 |
| 8,375,654 B1 | 2/2013 | West et al. | |
| 8,397,443 B2 * | 3/2013 | Blom et al. | 52/126.7 |
| 8,505,864 B1 * | 8/2013 | Taylor et al. | 248/237 |
| 8,813,441 B2 * | 8/2014 | Rizzo | 52/173.3 |
| 2002/0116881 A1 | 8/2002 | Zimmerman | |
| 2004/0163334 A1 * | 8/2004 | Carlson | 52/126.6 |
| 2008/0121273 A1 | 5/2008 | Plaisted et al. | |
| 2009/0078299 A1 | 3/2009 | Cinnamon et al. | |
| 2010/0005735 A1 * | 1/2010 | Gillespie et al. | 52/126.6 |
| 2010/0031587 A1 * | 2/2010 | Weeks | 52/126.6 |
| 2011/0000519 A1 | 1/2011 | West | |
| 2011/0000520 A1 | 1/2011 | West | |
| 2011/0000526 A1 | 1/2011 | West | |
| 2011/0000544 A1 * | 1/2011 | West | 136/259 |
| 2011/0214365 A1 | 9/2011 | Aftanas | |
| 2011/0220180 A1 | 9/2011 | Cinnamon et al. | |
| 2011/0260027 A1 * | 10/2011 | Farnham, Jr. | 248/309.1 |
| 2011/0284058 A1 | 11/2011 | Cinnamon | |
| 2012/0073218 A1 * | 3/2012 | Zlatar | 52/126.6 |
| 2012/0144760 A1 * | 6/2012 | Schaefer et al. | 52/58 |
| 2012/0193310 A1 * | 8/2012 | Fluhrer et al. | 211/41.1 |
| 2012/0240484 A1 * | 9/2012 | Blom et al. | 52/126.7 |
| 2012/0255242 A1 * | 10/2012 | Patton | 52/126.6 |
| 2012/0301661 A1 * | 11/2012 | West et al. | 428/99 |
| 2013/0291479 A1 * | 11/2013 | Schaefer et al. | 52/745.21 |

FOREIGN PATENT DOCUMENTS

| | | |
|---|---|---|
| JP | 2009-002138 | 1/2009 |
| JP | 2011-106188 | 6/2011 |
| KR | 20-0412251 | 3/2006 |
| KR | 10-2010-0108961 | 10/2010 |
| KR | 10-1056531 | 8/2011 |
| WO | WO 2008-028151 | 3/2008 |

OTHER PUBLICATIONS

International Search Report and Written Opinion of the International Searching Authority, PCT Appl. No. PCT/US2013/046992 (dated Sep. 27, 2013), 17 pages.

* cited by examiner

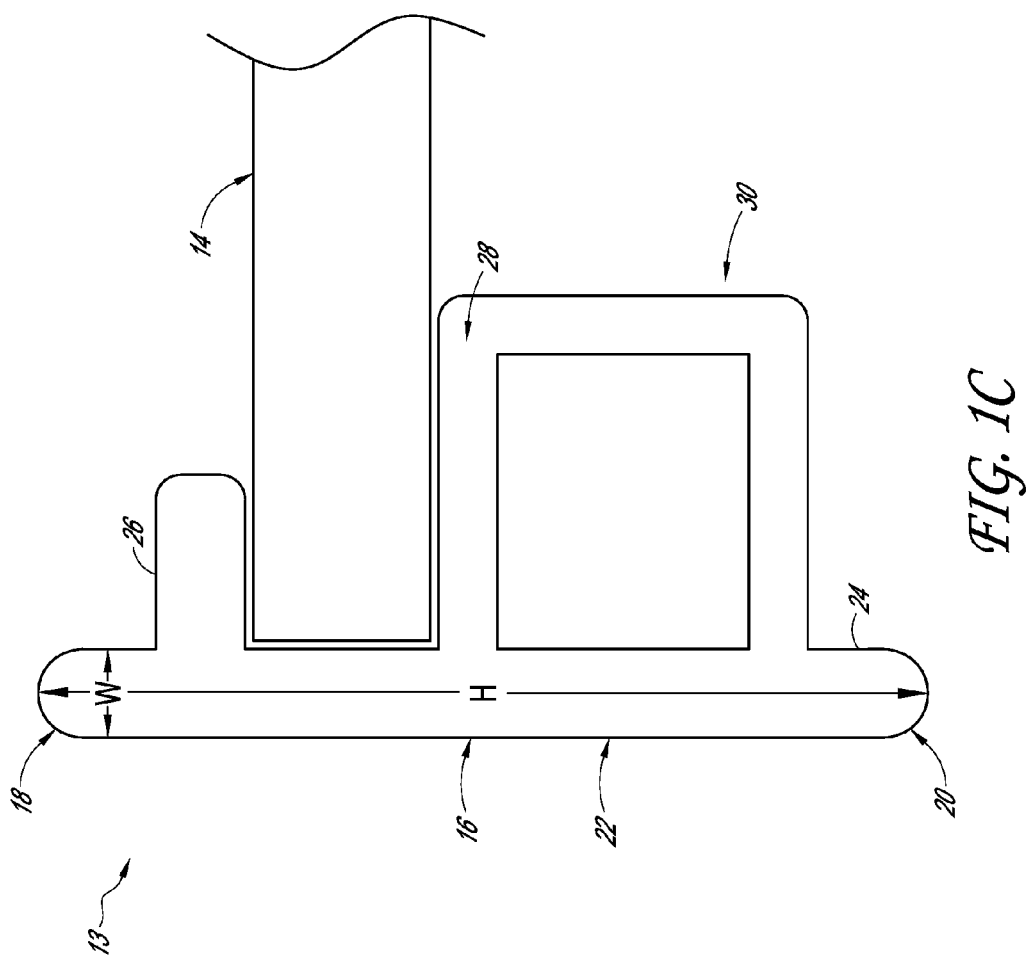

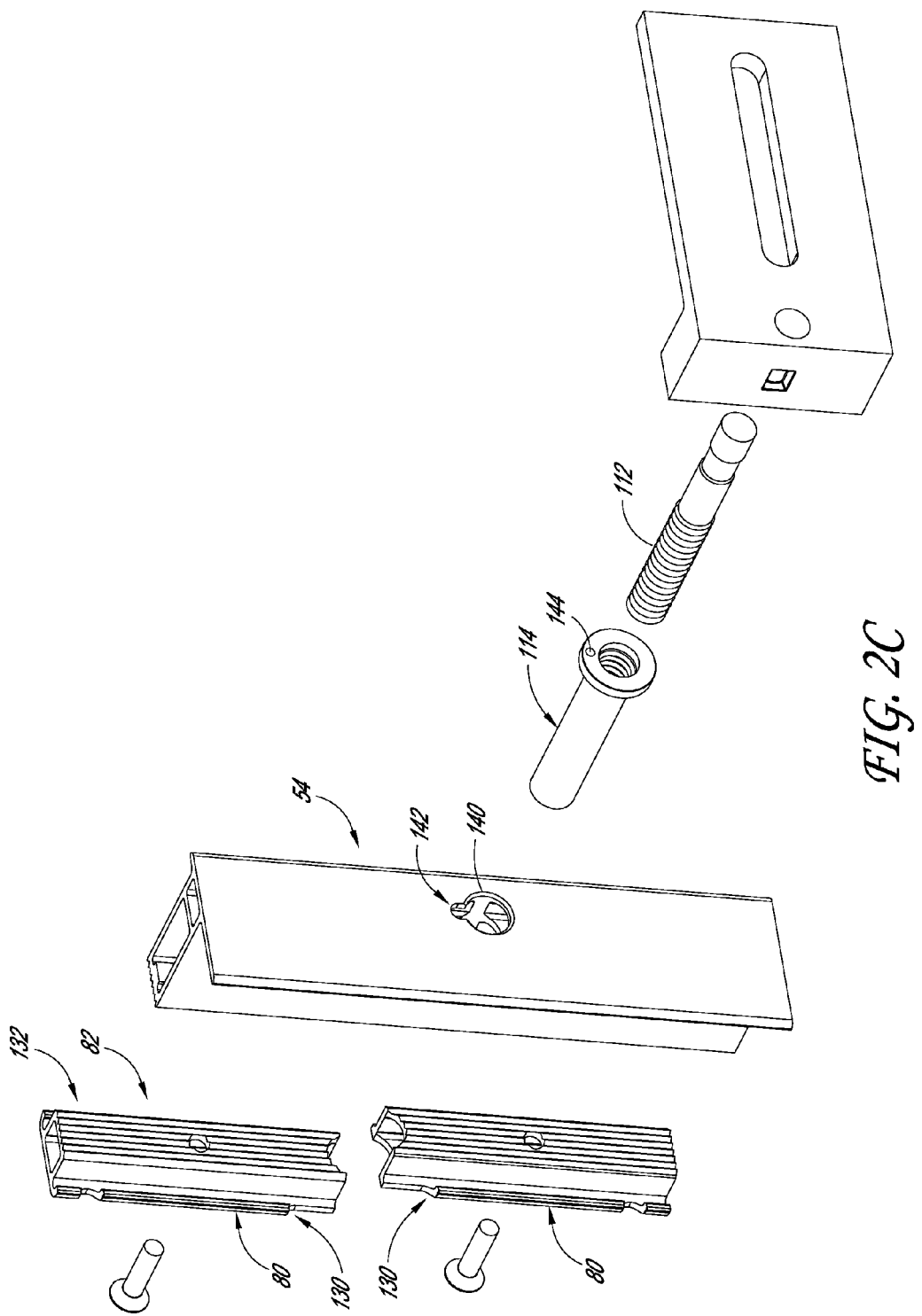

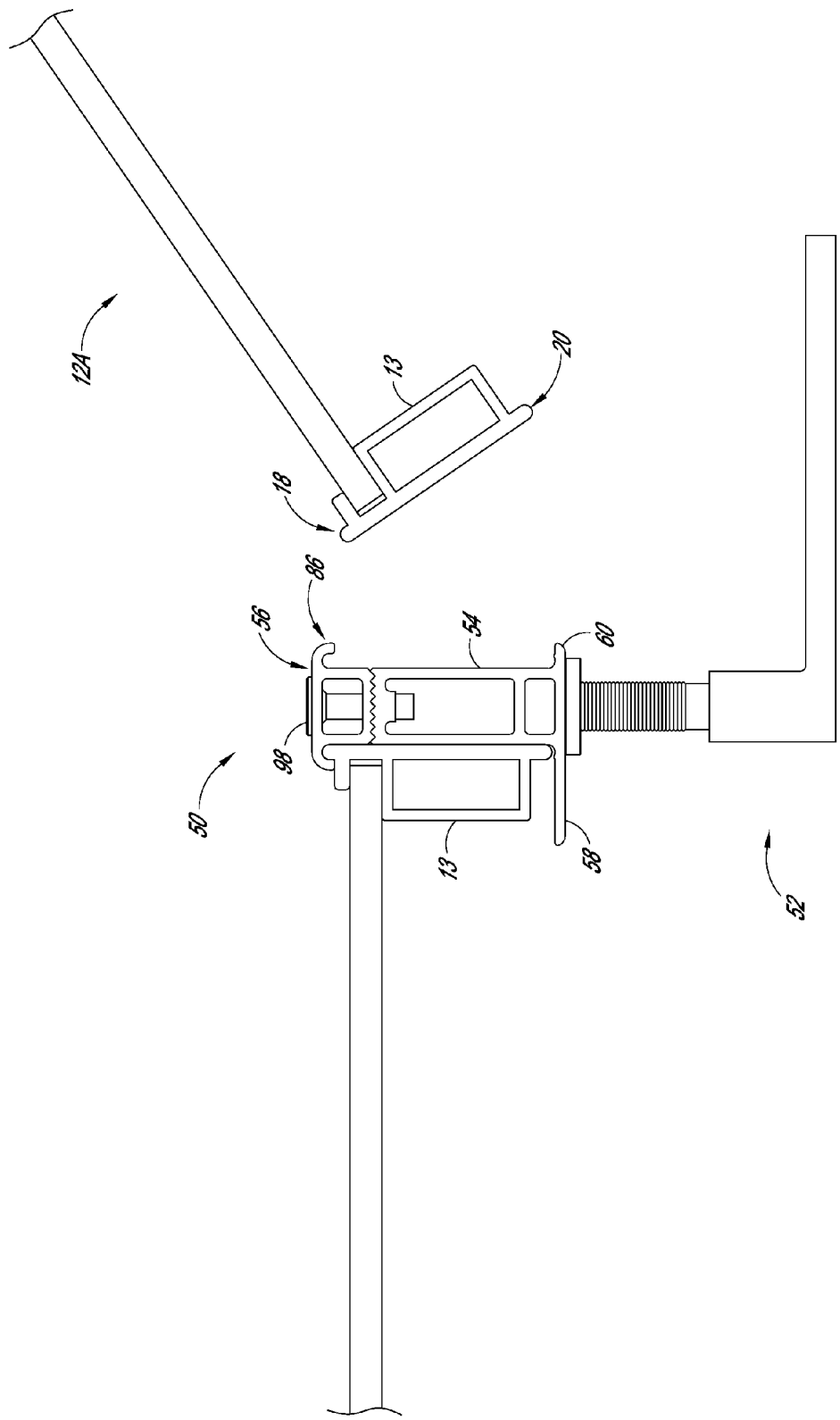

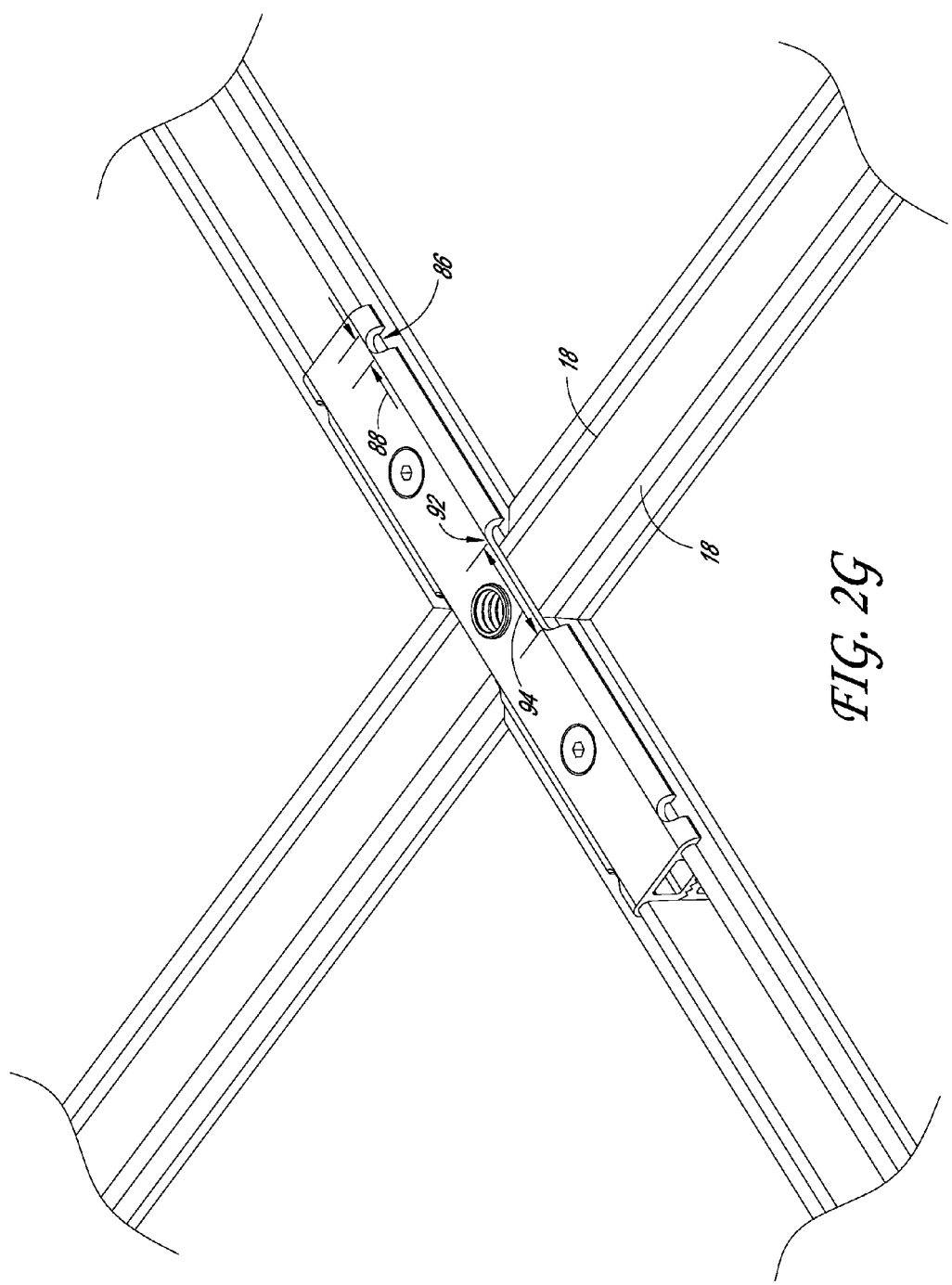

LEVELER FOR SOLAR MODULE ARRAY

BACKGROUND OF THE INVENTIONS

1. Field of the Inventions

Embodiments of the subject matter described herein relate generally to devices and systems from mounting solar modules to fixed surfaces such as roofs.

2. Description of the Related Art

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules (or "solar tiles") interconnected with wiring to one or more appropriate electrical components (e.g., switches, inverters, junction boxes, etc.).

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Regardless of an exact construction of the PV laminate, most PV applications entail placing an array of solar modules at the installation site in a location where sunlight is readily present. This is especially true for residential, commercial or industrial applications in which multiple solar modules are desirable for generating substantial amounts of energy, with the rooftop of the structure providing a convenient surface at which the solar modules can be placed.

As a point of reference, many commercial buildings have large, flat roofs that are inherently conducive to placement of a solar module array, and are the most efficient use of existing space. By contrast, many residential roofs may be sloped or angled such that placement of a solar module may be more difficult due to gravitational forces imposed on the angled modules. While rooftop installation is thus highly variable, it can be important to ensure that the array of solar modules is reliably and stably anchored to the roof, whether the roof is an angled or flat roof. Moreover, it can be important to ensure that a user can easily, effectively, and rapidly mount one or more solar module(s) to the roof.

SUMMARY

An aspect of at least one of the embodiments disclosed herein includes the realization that certain known mounting systems for mounting solar modules to fixed surfaces such as roofs include excessive components that can be either reduced or eliminated and can require excessive labor for removing and replacing modules. For example, one known solar module mounting system is commercially available from Zep Solar. The Zep Solar system from mounting photovoltaic modules to a fixed surface such as a roof include three unique parts.

Firstly, the Zep Solar system includes splicing interlocks which are used to connect the frames of two adjacent modules together. A separate leveling foot is used only in locations where the leveling foot can be attached directly to frame of a module and where it is necessary to include a roof anchor. A third device known as a "hybrid interlock", includes both splicing/interlock features for attaching two adjacent modules to each other as well as a connection for anchoring the splicing device to the roof.

Other known solar module mounting systems include rails that are initially mounted directly to a roof. The solar modules are then engaged with the rails and then slid laterally into their final desired location. Once in a desired location, the modules are fixed to the rails.

Occasionally, a solar module that is surrounded by other solar modules in an array, is damaged and thus requires replacement. Solar mounting systems in which the solar modules must be slid along rails present a significant difficulty when the need arises for replacing a solar module. In this situation, the rail-mounted array must be partially disassembled, i.e., the undamaged solar modules adjacent to the damaged module must be slid off of the rail first before the damaged module can be removed. The replacement module is then slid along the rails back into place. In a large array, this method of repair can require the removal of many solar modules. Thus, a solar module mounting system that can allow individual solar modules to be removed from an array, without removing adjacent modules can provide a significant labor savings.

The Zep Solar mounting system noted above, also suffers from difficulties. For example, the Zep Solar splice device includes a rotatable fastener that extends and rotates about an axis that is generally horizontal. The rotatable fastener includes an engagement face for engaging a tool that also must faces horizontally. Thus, in order to remove a solar module that is surrounded by other solar modules, a special tool is needed that includes a fastener engaging portion that extends at a right angle. The tool must be inserted between two adjacent solar modules and moved so that the engagement portion reaches the engagement face of the rotatable fastener. This procedure can be particularly difficult when a worker is attempting to reach solar module that is surrounded by other modules, and thus in a position in which it is difficult to achieve the alignment of the special tool and the engagement face of the rotatable fastener.

Thus, in accordance with at least some embodiments disclosed herein, a mounting system for mounting solar modules to a fixed structure such as a roof can be configured to allow solar modules to be removed from an array of solar modules without the need to slide adjacent solar modules off of rails. Further benefits can be achieved by configuring a solar module mounting system such that the engagement portions of the mounting system can be removed by engaging upwardly facing fasteners. Additionally, further benefits can be achieved by configuring a solar module mounting system such that vertical adjustments can be made to the mounting height of solar modules by engaging adjustment mechanism with an upwardly facing engagement portion.

In accordance with at least one embodiment, a height-adjustable roof anchor for solar modules can comprise a base having a hole therein, the hole comprising an inner wall. A height adjustment member can have an upper portion configured to engage at least one solar module, the height adjustment member extending from the hole of the base and upwardly away from the base, the height adjustment member having an annular groove formed around the circumference of the rod, the annular groove positioned within the hole. A locking portion can engage the annular groove so as to retain the height adjustment member in the hole and allow the height adjustment member to rotate about a rotational axis, wherein the height adjustment member is configured to adjust a height of the at least one solar module during rotation about the rotational axis.

In another embodiment, a method can be provided for assembling a height-adjustable roof anchor for solar modules which includes a base having a hole therein, the hole comprising an inner wall and a height adjustment member having an annular groove formed around a circumference of the height adjustment member. The method can comprise inserting the height adjustment member in the hole such that the annular groove is positioned within the hole and positioning a locking portion so as to extend into the annular groove.

In accordance with another embodiment, a solar array can comprise a plurality of solar modules, each solar module having at least four sides and a frame extending around the four sides of each solar module. The plurality of braces supporting at least one side of one of the frames can be shorter than twice a length of one of the sides of one of the frames. Additionally, a plurality of roof anchors can be configured to be mounted to a roof, each roof anchor coupled to one of the plurality of braces.

In another embodiment, a method of assembling a solar array can comprise mounting a plurality of roof anchors to a roof. The method can also include coupling a brace to each roof anchor, positioning an edge of a solar module on each brace, and swinging the solar module downward to engage the end of the solar module with the brace.

In another embodiment, a kit for assembling a solar array can include a plurality of roof anchors configured to be coupled to a roof. The kit can also include a plurality of braces, each brace configured to support one or more frames of a solar module and configured to couple to one of the plurality of roof anchors, each brace being shorter than twice a length of a side of one of the frames.

In accordance with an embodiment, a solar array can comprise a plurality of solar modules, each solar module having at least four sides and comprising a solar module frame extending around at least a portion of the periphery of the solar module. At least a first brace member can have a first support surface extending below at least a first solar module frame of the first solar module. At least a second brace member can have a second support surface extending over the first solar module frame. A first connector can connect the first brace member to the second brace member such that the first solar module is captured between the first and second support surfaces.

In accordance with another embodiment, a solar array can comprise at least first, second, third, fourth, and fifth solar modules, each solar module having at least four sides, wherein the first, second, third, and fourth solar modules are respectively disposed adjacent to the four sides of the fifth solar module. Additionally, the array can include braces for removal of the bracing the juxtaposed sides of the solar modules to each other so that the fifth solar module can be disconnected from the first, second, third, and fourth solar modules and lifted upwardly without the need to slide the fifth solar module laterally.

In accordance with another embodiment, a brace for connecting solar modules can comprise a body member having first and second sides spaced from each other, a first lip extending outwardly from and along the first side of the body and configured to extend below a frame of a first solar module disposed adjacent to the first side and a second lip extending outwardly from and along a second side of the body and configured to extend below a frame to a second solar module disposed adjacent to the second side. The brace can also include at least a first top member configured to be connected to the body member and having a first engagement portion extending outwardly from and along a first side of the top member, the first engagement portion configured to engage in upwardly extending ridge of a first solar module frame, and a second engagement portion extending outwardly from and along a second side of the top member, the second engagement portion configured to engage in upwardly extending ridge of a second solar module disposed adjacent to the first solar module. A connector can be configured to connect the first top member to the body member so as to press the frames of the two adjacent solar modules disposed along the first and second sides of the body member between the lips of the body member and the engagement portions of the top member.

BRIEF DESCRIPTION OF THE DRAWINGS

FIG. 1C is an enlarged sectional view showing a typical cross section of the frame of each of the plurality of solar modules.

FIG. 2C is a bottom perspective, exploded view of the coupler of FIG. 2B.

FIG. 2D is a side elevational view of the coupler and height adjustment device of FIG. 2A connecting two solar modules to each other.

FIG. 2G is a perspective view of the coupler of FIG. 2A connecting four solar modules together at their corners.

DETAILED DESCRIPTION

Figure 1A:
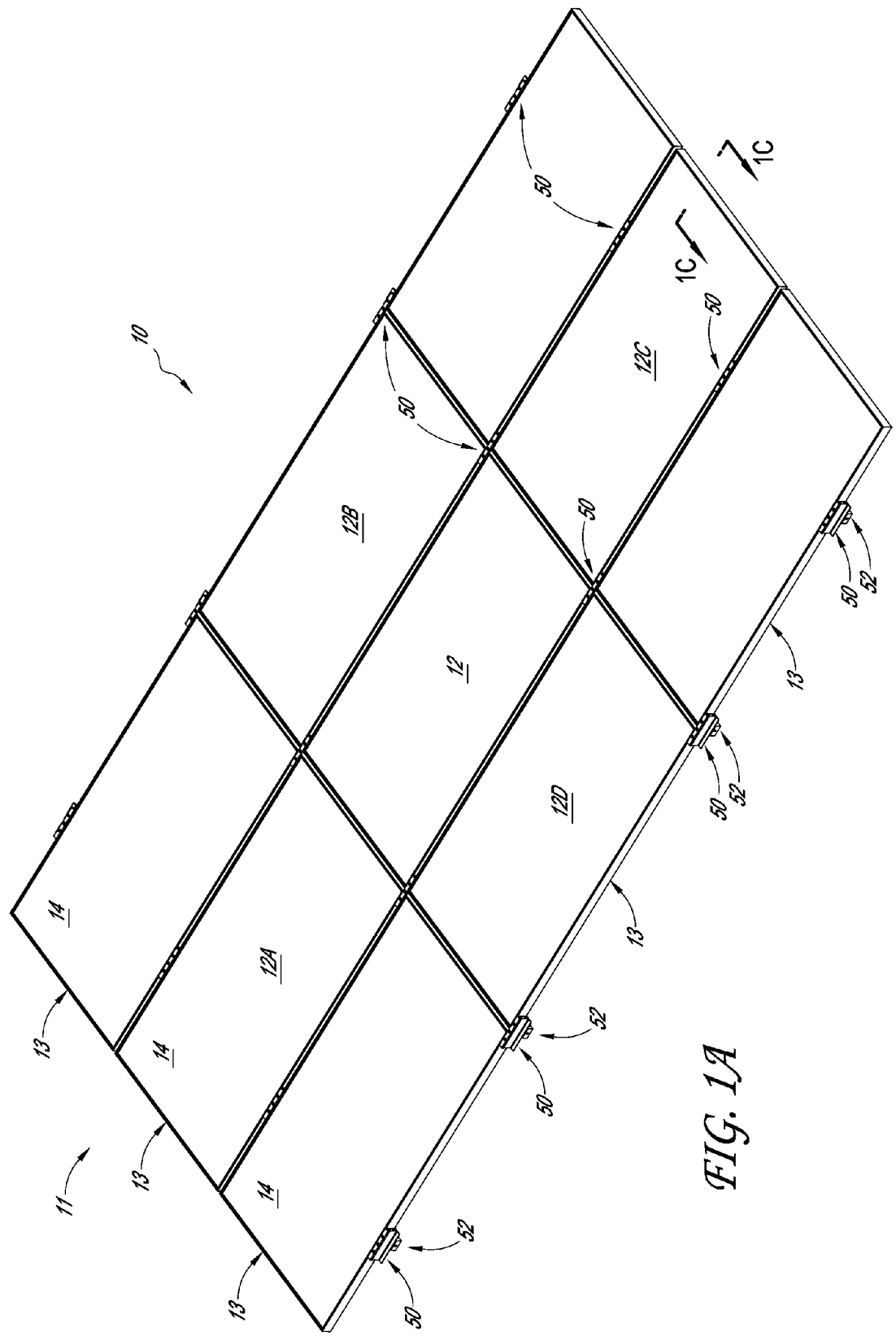
FIG. 1A is a perspective view of a solar power array including a plurality of solar modules.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are often described in the context of photovoltaic arrays and modules. However, these inventions can be used in other contexts as well, such as concentrated PV systems, thermal solar systems, etc.

Figure 1B:
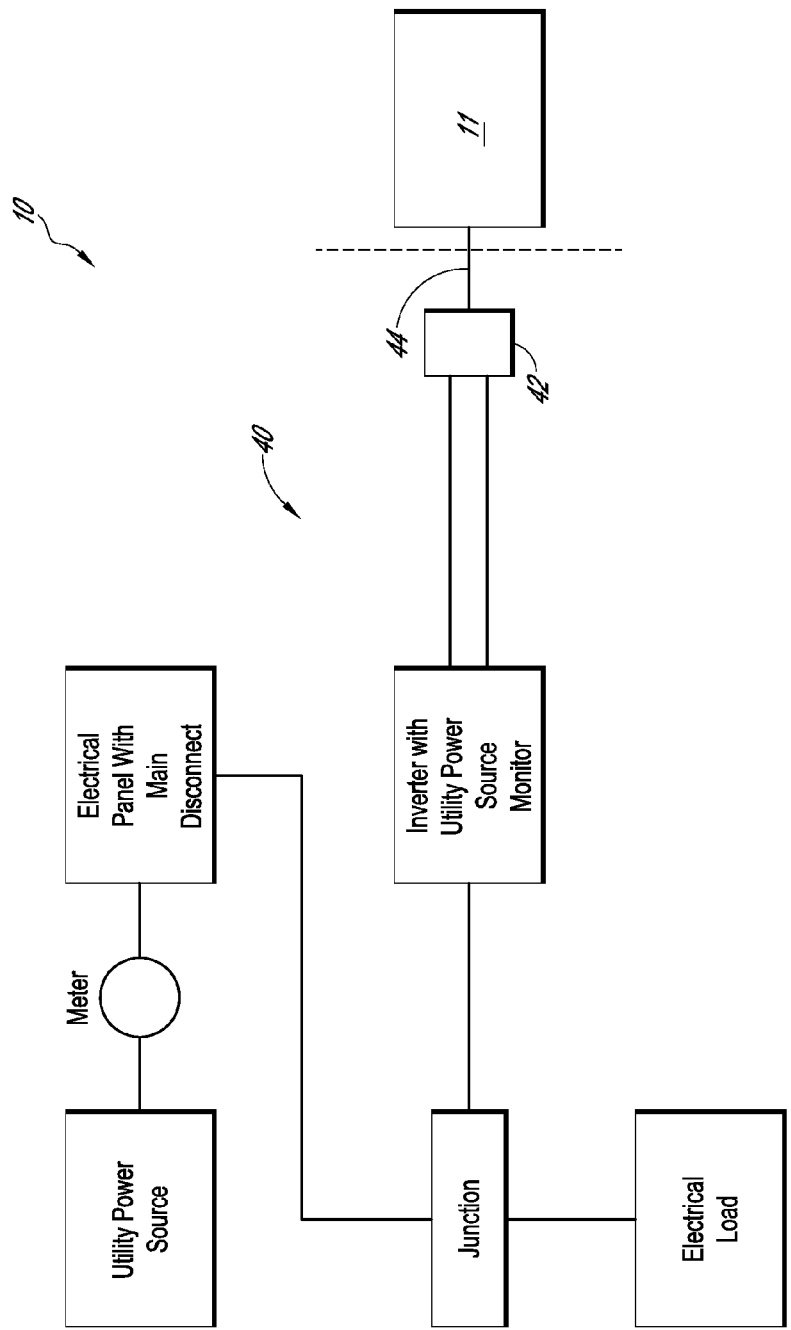
FIG. 1B is a schematic diagram of an optional electrical system that can be connected to the array of FIG. 1A.

FIGS. 1A and 1B illustrate a solar power system 10 including a solar array 11 having a plurality of solar modules 12. Each solar module 12 can include a laminate 14 supported by a frame 13. In some embodiments, the solar modules 12 can be the same as or similar to the modules disclosed in U.S. Patent Publication No. 2009/0320908, which is incorporated by reference herein in its entirety for all purposes.

With reference to FIG. 1B, the solar power system 10 can be incorporated into electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which are hereby expressly incorporated by reference in its entirety for all purposes.

With continued reference to FIGS. 1A and 1C, each laminate 14 can include an array of solar cells, such as PV cells, configured to convert light into electricity. The frame 13 can provide structural support for the corresponding laminate 14 around the peripheral edges of the laminate 14. In some embodiments, the frame 13 can be a separate component that is coupled to the laminate 14.

The cross section of FIG. 1C illustrates the typical cross section of the peripheral members forming the frame 13. Each of the members forming the frames 13 can be formed of longitudinally extending the frame members, each having the cross section illustrated in FIG. 1C, and joined at the corners using 45 degree cuts. However, other techniques can also be used.

In the illustrated embodiment, the frame 13 includes a first outer member 16 which extends generally perpendicular to the laminate 14. The outer member 16 includes an upwardly projecting ridge 18 and a downwardly projecting ridge 20. In the illustrated embodiment, the upper protrusion 18 has a width W.

The outer member 16 includes an outwardly facing surface 22 which generally forms the lateral, outwardly facing surface of the module 12. Projecting from the inner surface 24 of the outer member 16, the frame 13 can include an upper sealing ledge 26 and a lower sealing ledge 28. The upper and lower ledges 26, 28 are spaced apart such that the laminate 14 can fit therebetween. Optionally, various sealing techniques can be used to seal the edge of the laminate 14 between the upper and lower ledges 28.

In the illustrated embodiment, the lower ledge 28 forms part of a stiffening assembly 30 which also extends from the inner surface 24 of the outer member 16. The size and shape of the stiffening assembly 30 can be chosen to provide the desired stiffness of the frame 13. In the illustrated embodiment, the stiffening assembly 30 includes a rectangular tubular configuration. However, other shapes can also be used.

The frame 13, along with the components noted above, can be formed as a straight monolithic sections. For example, the frame pieces 13 can be extruded from aluminum, other metals or molded from plastic, or other materials. In some embodiments, the frame 13 is made from aluminum. Other configurations and dimensions can also be used.

With reference to FIG. 1A, the array 11 includes modules 12 mounted to each other and, collectively, to a roof structure (not shown) with a plurality of brace assemblies 50. Some of the brace assemblies 50 include optional height adjustment devices 52.

Figure 2A:
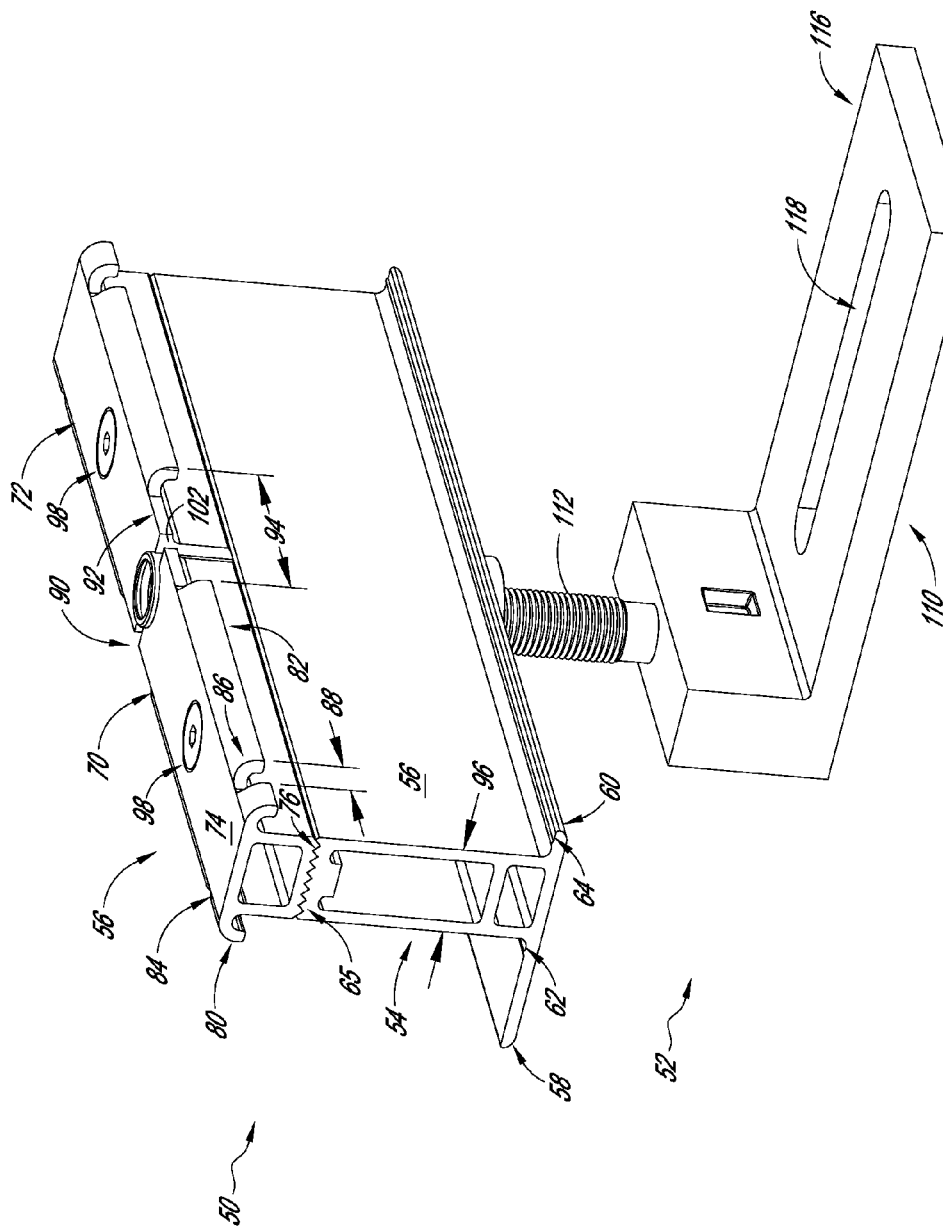
FIG. 2A is a perspective view of a first embodiment of a solar module coupler and a detachable height adjustment device.

With reference to FIG. 2A, the brace assembly 50 can include a lower portion 54 and an upper portion 56. The lower and upper portions 54, 56 can be configured to capture a portion of the frames 13.

In some embodiments, the lower portion 54 can include a central body portion 56. In the illustrated embodiment, the central body portion 56 is in the configuration of a box beam that extends in a generally longitudinal direction. At a lower edge of the central body portion 56, the lower portion 54 can include a first lip 58 extending outwardly from and along a lower edge of the main body portion 56.

Optionally, the lower portion 54 can include a second lip 60 extending outwardly from and generally along a lower edge of the central body portion 56 on a side opposite from the first lip 58. The first and second lips 58, 60 are sized and configured to support a portion of the frame 13.

For example, in some embodiments, the first and second lips 58, 60 are sized to support the lower ridge 20 (FIG. 1C) of two juxtaposed frames 13. Optionally, in some embodiments, the first and second lips 58, 60 include retention ridges 62, 64 that are sized and configured to help retain the lower protrusion 20, for example, by providing for a snap-fit engagement of the frame 13. The engagement of the frame 13 with the ridges 62, 64 is described in greater detail below with reference to FIGS. 2D-2F.

The upper portion 56 of the coupling member 50 can be formed in one or more pieces. In the illustrated embodiment, the upper portion is formed from a first portion 70 and a second portion 72. The first and second portions 70, 72 have essentially the same configuration and shape except that they are mirror images of one another. Thus, only the first portion 70 is described in detail below, with the understanding that the portions of the second portion 72 which are not expressly described below, are essentially the same as the corresponding components of the first portion 70, except in a mirror image orientation.

Figure 2B:
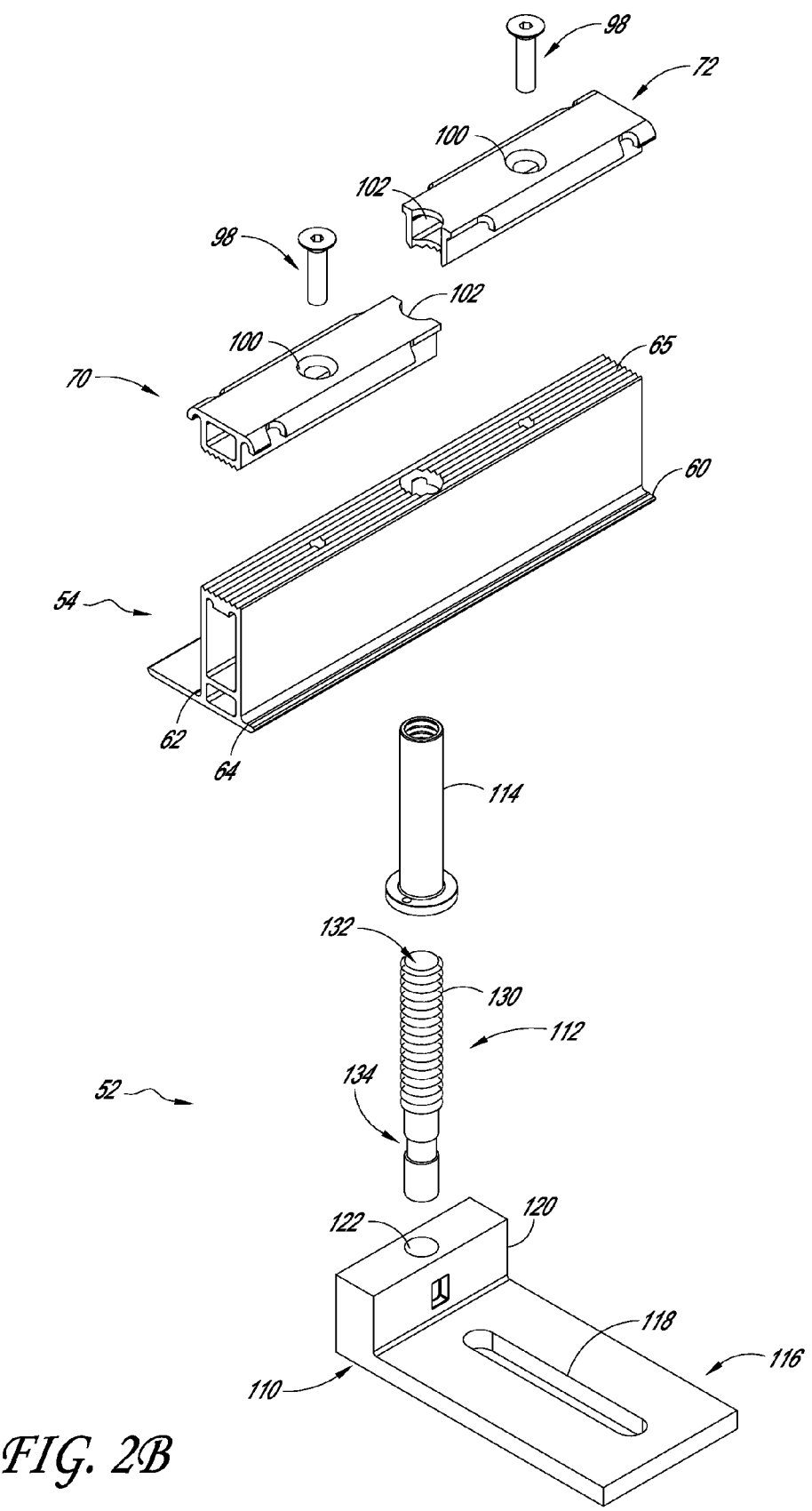
FIG. 2B is an exploded view of the coupler and detachable height adjustment device of FIG. 2A.

With continued reference to FIGS. 2A and 2B, the first portion 70 includes a central elongated portion 74 which extends general longitudinally and parallel to the portion 56 of the lower portion 54. Optionally, a lower surface 76 can include ridges complimentary to the ridges of the upper surface 65 of the lower portion 54. In the illustrated embodiment, the ridges on both the upper surface 65 and the lower surface 76 extend generally longitudinally along the coupling member 50. As such, wherein at least one of the upper surface 65 and the lower surface 76 includes ridges, the engagement and electrical coupling between the upper portion 56 and the lower portion 54 is further ensured thereby ensuring reliable electrical grounding between the upper portion 56 and the lower portion 54. However, other configurations can also be used.

The first portion 74 also includes a first lip 80 extending outwardly from and along an upper edge of the first portion 74 and a second lip 82 extending outwardly from and generally along an upper edge of the first portion 74. The first lip 80 is configured to cooperate with the first lip 58 of the lower portion 54 to capture a portion of a frame 13 there between.

In the illustrated embodiment, the first and second lips 80, 82 are generally hook shaped, extending first, outwardly from the first portion 74, then downwardly toward the lower portion 54. As such, the first and second lips 80, 82 can provide a further advantage in simplifying a method for connecting a frame 13 to the coupling device 50, described in greater detail below with reference to FIGS. 2D-2F.

The first portion 74 can also include notches 84, 86 in the first and second lips 80, 82, respectively. The notches 84, 86 can have a width 88 that is at least as wide as the width W of the upper ridge 18 of the frame 13 (FIG. 1C). As such, the coupler 50 can be connected to a frame 13 at a corner, wherein one part of the frame 16 extends perpendicular to the coupler 50, and another side where the frame extends parallel to the coupler 50.

Optionally, the upper portion 56 can include centrally positioned notches 90, 92 on the first and second lips 80, 82. In the illustrated embodiment, the notches 90, 92 have a width 94 that is greater than the width 88.

In some embodiments, the width 94 can be about the same size as or greater than a thickness 96 of the central portion 56 plus two times the width W of the upper ridge 18 (FIG. 1C). Sized as such, the notch 94 can allow more flexibility in the placement of the coupler 50, and in particular, can allow the coupler 50 to be used in a position attaching the corners of two modules 12 and straddling the corner. This arrangement is described in greater detail below with reference to FIG. 2G.

With continued reference to FIG. 2B, each of the first and second portions 80, 72 can be attached to the lower portion 54 in any known manner. In the illustrated embodiment, threaded fasteners 98 extend through apertures 100 to secure the first and second portion 70, 72 to the lower portion 54.

Optionally, the upper portion 56 can include a height adjustment aperture 102. In the illustrated embodiment, because the upper portion 56 is formed of two portions 70, 72, each of the first and second portions 70, 72 form approximately half of the aperture 102. However, other configurations can also be used.

The height adjustment aperture 102 can be size to accommodate the insertion of a tool, from a position above the coupler 50, and down into the interior of the coupler 50, to engage the height adjustment device 52.

The height adjustment device 52 can include a base portion 110, a rotatable height adjuster 112 which cooperates with a fixed threaded member 114 which can be fixed to the coupler 50. The base portion 110 can be formed in any configuration designed for a fixed connection to a structure such as a roof. In some embodiments, the base portion 110 can be configured to be connectable to a roof stud, or other structural member, with a threaded fastener such as a lag screw or the like.

In the illustrated embodiment, the base portion includes a mounting plate portion 116 with an elongated slot 118. The elongated slot 118 is preferably sized to receive an appropriately sized lag screw, designed for the engagement of a roof structure and/or a roofing stud. The base portion 110 can also include a receiver portion 120 for engagement with the rotatable adjuster 112.

In the illustrated embodiment, the receiver portion 120 is generally block shaped with an upper aperture 122. The rotatable adjuster 112 can include a threaded body portion 130, an upwardly facing engagement surface 132, and a neck portion 134. The neck portion 134 can be in the form of an annular groove disposed on the outer surface of the rotatable adjuster 112.

In some embodiments, the rotatable adjuster 112 can be swaged into the block portion 120. For example, the rotatable adjuster 112 can be inserted through the aperture 122 into the block 120. Using an appropriate swaging technique, a portion of the block 120 can be pressed inwardly such that an inner wall of the aperture 122 extends into the necked portion 134, thereby trapping the rotatable adjuster 112 within the block 120, but allowing the rotatable adjuster 112 to freely rotate relative to the base 110. In some embodiments, the base portion and the block portion 120 can be made from aluminum, the swaging of which is well known in the art.

In the illustrated embodiment, the engagement surface 132 is in the form of a female allen wrench head. However, other engagement surfaces can also be used.

With the rotatable adjuster 112 mounted as such, the threads of the rotatable adjuster 112 can cooperate with internal threads on the coupler 50, so as to allow the coupler 50 to be moved upward and downwardly relative to the base 110. In some embodiments, as noted above, an internal thread member 114 can be directly formed in the lower portion 54.

With reference to FIG. 2C, the internal thread member 114 can extend through an aperture 140 extending through the lower portion 54. Optionally, the lower portion 54 can include an anti-rotation recess 142 configured to cooperate with a portion of the internal thread member 114 such that the thread member 114 can be fixed relative to lower portion 54. In some embodiments, the internal threaded member 114 can include an anti-rotation aperture 144 configured to receive a fastener (not shown) extending through the aperture 144 and into the anti-rotation recess 142 so as to prevent any relative rotation between threaded member 114 and the lower portion 54. As such, when the rotatable adjuster 112 is rotated relative to the lower portion 54, and thus relative to the internal thread member 114, the rotatable adjuster 112 operates as a jack screw, as the rotatable adjuster 112 is rotated clockwise or counter clockwise. Other configurations can also be used.

In some embodiments, the threaded sleeve can also include a feature (not shown) that allows the threaded sleeve to be snapped into the base, but that will prevent the threaded sleeve from being removed unintentionally, such as by wind forces. The feature can be a spring-loaded detent, barb formed in the sleeve, or any other suitable mechanism.

Optionally, with reference to FIG. 2C, the first and second lips 80, 82 can optionally include one or more ridges, teeth, or spikes on the distal end thereof. In the illustrated embodiment, the first and second lips 80, 82 include a sharpened edge 130, 132 so that when they are pressed into engagement with a frame 13, the sharpened edges 130, 132 penetrate the outermost surface of the frame 13, to thereby provide better electrical contact with the frame 13. For example, in some embodiments, the frame 13 can be aluminum with a anodized outer coating. As such, the sharpened edges 130, 132 can help pierce the outermost anodizing of the frame 13, and thereby provide better electrical contact between the coupler 50 and the frame 13. Further, the sharpened edges 130, 132 can also be further beneficial where the coupler 50 is made from a different material than the frame 13, for example, but without limitation, where the coupler 50 is made from stainless steel and the frame 13 is made from aluminum.

With continued reference to Figures D, E and F, the above configuration can accommodate two different methods for attaching coupler 50 to a module 12. Firstly, as is apparent from the above description, the upper portion 56 of a coupler 50 can be removed, the frame of the module can be placed such that the upper ridge 18 of a frame engages the hook shaped lip 80 with the lower protrusion 20 of the frame supported by the lower lip 58. The upper portion 56 can be secured to the lower portion 54 of the coupler with the threaded fasteners 98.

Additionally, the above configuration of the coupler also allows a module 12 to be connected to the coupler 50 by a "hook and swing motion." For example, as shown in FIG. 2D, the coupler is fully assembled with the upper portion 56 attached to the lower portion 54. A solar module 12A is illustrated in the position in which it is tilted relative to coupler 50. The module 12A can be manually moved into a position in which the upper protrusion 18 is engaged with the hook shaped lip 82. Then, the module 12A can be tilted downwardly, in the direction of arrow T until the module 12A reaches the orientation illustrated in FIG. 2F.

As noted above, the lip 60 can include a ridge 64 configured to cooperate with the lower protrusion 20 of the frame 13 so as to provide a snap fit. Those of ordinary skill in the art fully understand how to size and configure the lips 60, 82 and the ridge 64 to provide such a snap fit.

For example, the minimum distance between the uppermost portion of the ridge 64 and the uppermost portion of the inner surface of the hook shaped lip 82 can be slightly closer than the overall vertical Height of the outer portion 16 of the frame 13. As such, as the module 12A is tilted in the direction indicated in FIG. 2E, and the lower protrusion 20 reaches the ridge 64, the inherent elasticity of the coupler 50 and in particular the hook shaped lip 82 and the lip 60 can allow the lips 82, 60 to slightly spread apart as the lower protrusion 20 passes over the ridge 64, then due to their elasticity, snap back to their original spacing, thereby trapping the outer member 16 of the frame 13 in the position illustrated in FIG. 2F. Similarly, the lips 58, 80 and ridge 62 can be configured in essentially the same manner such that solar modules 12, 12A can be attached to both sides of the coupler 50 without the need for moving the lips 80, 82 relative to the lower lips 58, 60.

Figure 2E:
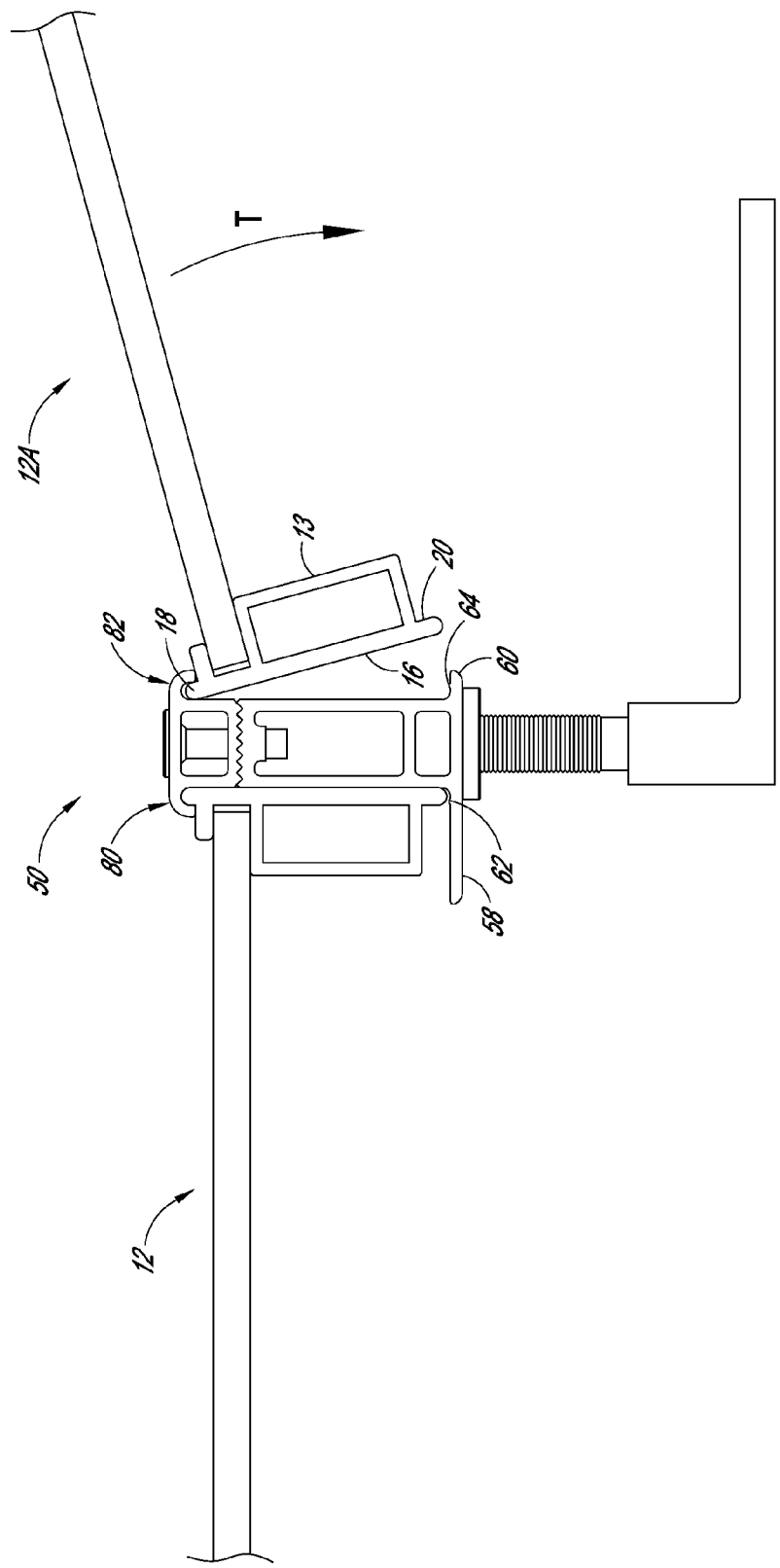
FIG. 2E is a side elevational view of the coupler connected to one solar module and a second solar module tilted relative to the coupler.
Figure 2F:
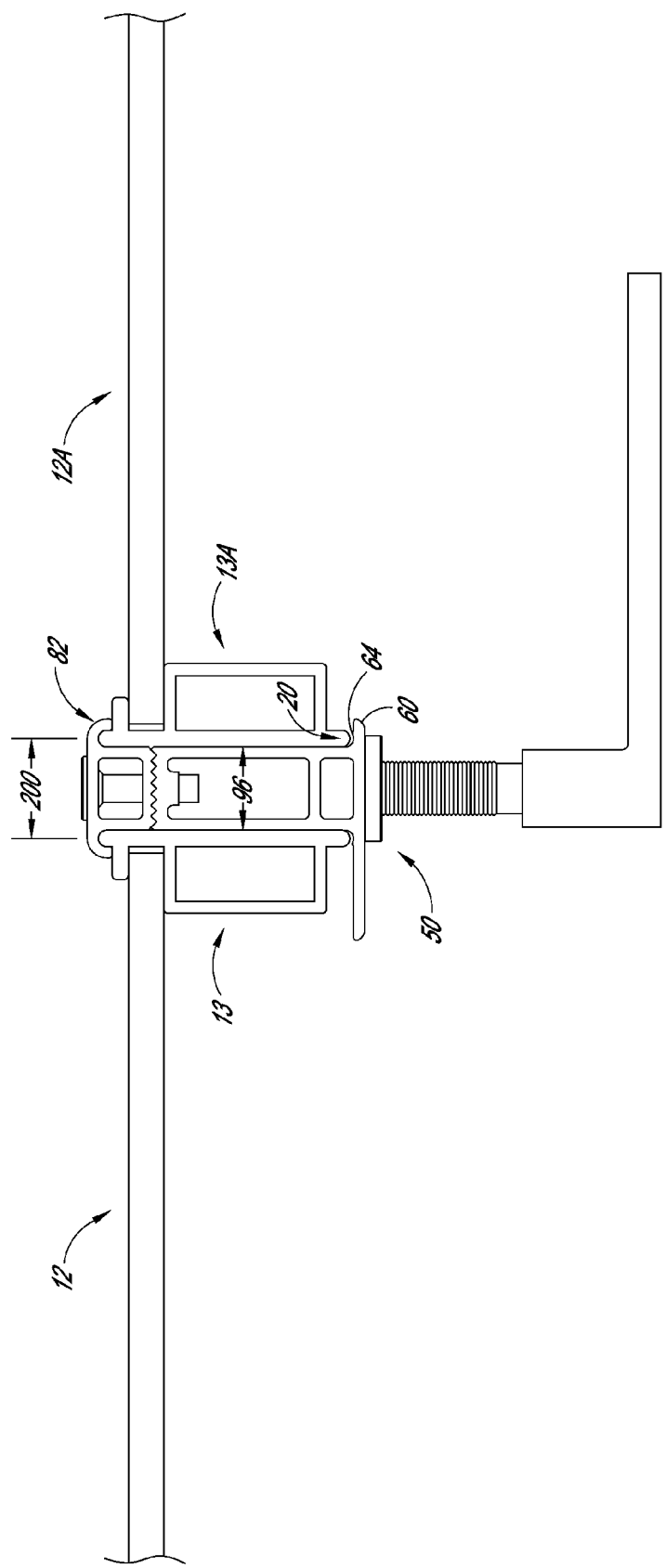
FIG. 2F is a side elevational view of the arrangement shown in FIG. 2E, with one solar module engaging a hook portion of the coupler and being tilted into an engagement position.

With continued reference to FIG. 2F, where a coupler 50 is used to connect two adjacent solar modules 12, 12A, the solar modules 12, 12A are spaced apart such that the inwardly facing surfaces of their respective upper ridges 18 as defined by the width 200. The width 200, in the illustrated configuration, is approximately the width 96 of the central portion of the coupler 50 plus two times the width W of the outer portion 16 of the frames 13. This spacing is about the same as or less than the width 94 of the notch 92 (FIG. 2A) described above.

More particularly, with reference to FIG. 2G, when a coupler 50 is used to connect two or more modules at a corner, the width 94 of the notch 92 allows the notch 92 to straddle the spaced apart upper ridges 18 of two adjacent modules 12. Note that the laminates 14 of the solar modules illustrated in FIG. 2G have been removed for purposes of illustration. Additionally, as also noted above, the width 88 of the notches 86 also allow the coupler 50 to be positioned near a corner of a module 12, but not straddling the spacing between two adjacent modules 12. Rather, the notches 86 could be aligned with single upper ridge 18 of a frame 13.

Figure 2H:
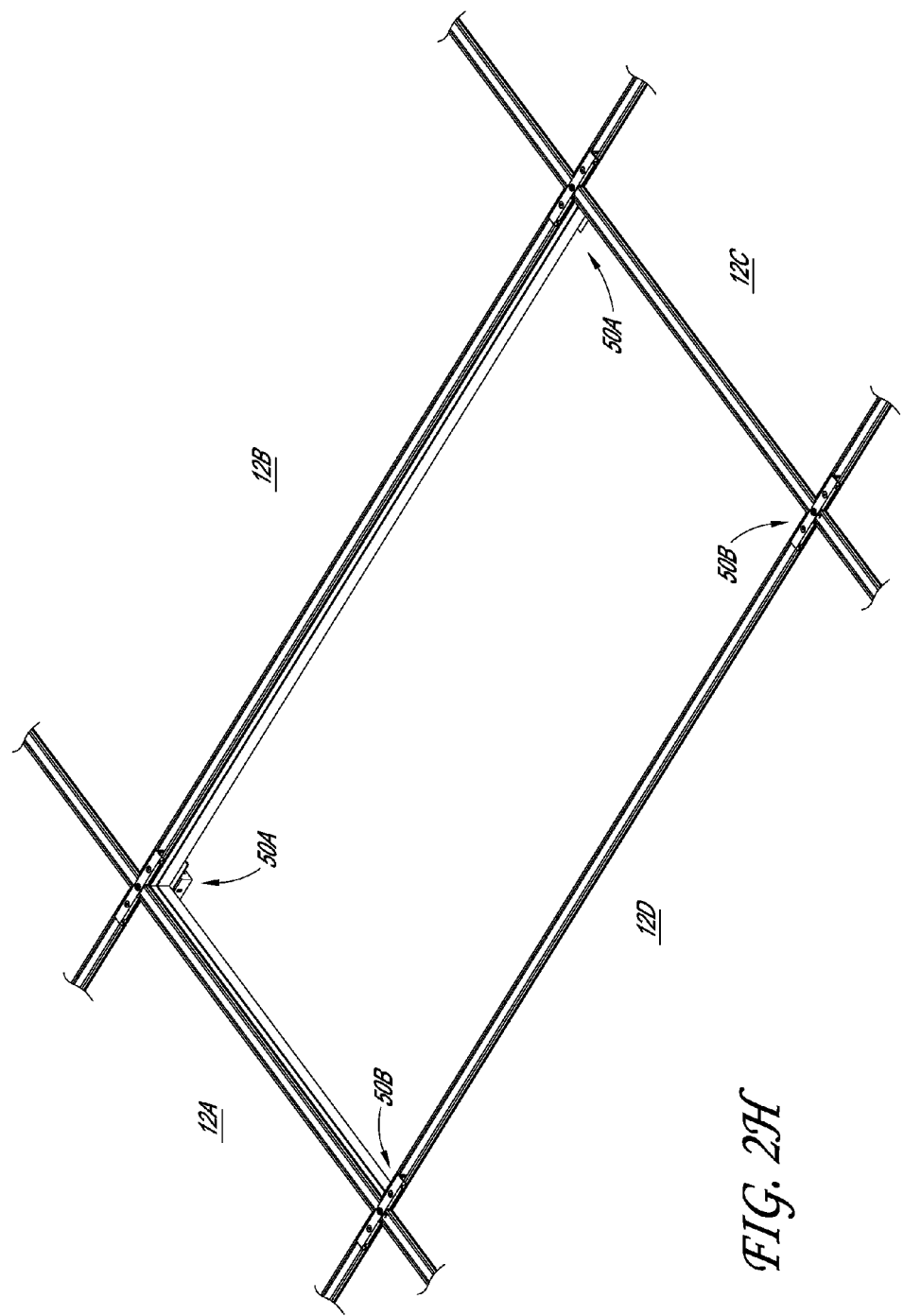
FIG. 2H is a perspective view of an array of solar modules with one solar module removed.

With reference to FIG. 2H, the couplers 50 can accommodate further advantageous methods for removing and reinstalling a solar module 12 from an array of solar modules. As shown in FIG. 2H, the upper portions 56 of two couplers 50 have been removed and the module 12 (FIG. 1A) has been removed by lifting and tilting the module 12 out of the fully assembled couplers 50B.

In order to reinstall another solar module into the original placement of the solar module 12, one edge of the solar module 12 can be lowered into position, into the orientation illustrated in FIG. 2E, such that in upper protrusion 18 of the frame 13 of the solar module 12 engages the hook shaped lip 82 of the couplers 50B. As the module 12 is tilted into place, the lower protrusion 20 can engage with the ridge 64 of the couplers 50B. Similarly, on the opposite edge of the module 12, the lower protrusion 20 eventually comes to rest on the first lip 58 of the couplers 50A. The lowering of the solar module 12 can be accomplished using suction cups (not shown) temporarily attached to the upper surface of the laminate 14, or other techniques. After the module 12A has been lowered into position, the upper portions 56 of the couplers 50A can be replaced, thereby returning the array 11 into the state illustrated in FIG. 1A.

Further, when installing and/or servicing the array 11, all of the couplers, 50, 50A, 50B, which are attached to height adjustment mechanisms, can all be adjusted to desired heights by inserting, directly from above, an engagement tool configured to engage the engagement surface 132 (FIG. 2B) of the rotatable height adjuster 112 so as to raise or lower each of the modules 12, to the desired height. As such, the heights of the various modules 12 of the array 12 can be easily adjusted.

Figure 3:
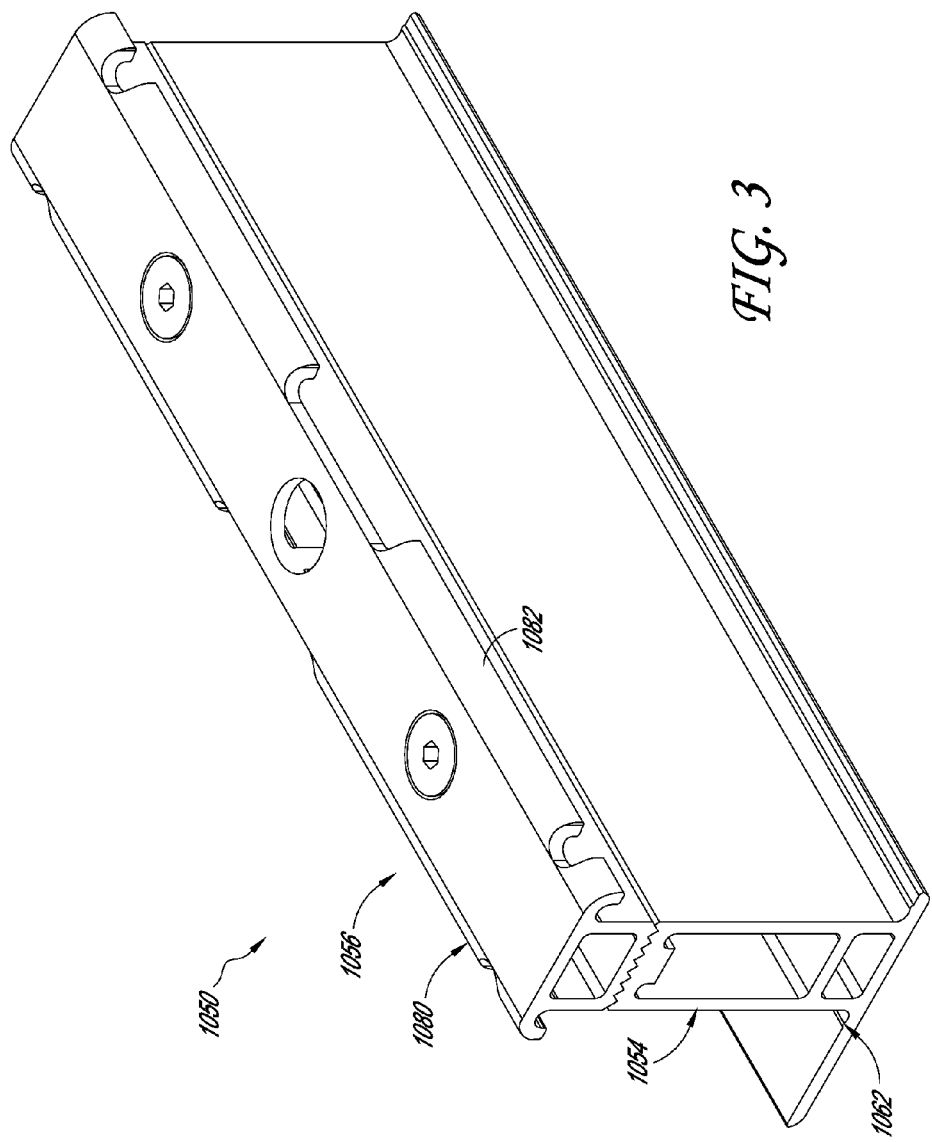
FIG. 3 is a perspective view of a second embodiment of the coupler of FIG. 2A.

FIG. 3 illustrates another embodiment of the coupler 50, identified by the reference numeral 1050. The components of the coupler 1050 that are the same or similar to the coupler 50, are identified with the same reference numeral, except that 1000 has been added thereto.

As shown in FIG. 3, the coupler 1050 can include an upper portion 1056 that is made from a single piece instead of two separate pieces 70, 72 of the coupler 50. The remaining components of the coupler 1050 as well as the use and operation, are essentially the same as the coupler 50.

In yet another alternative embodiment, the coupler 1050 can be formed such that the upper portion 1056 is permanently affixed to the lower portion 1054. For example, the coupler 1050 could be made from a single piece of material into a monolific body. Alternatively, the coupler 1050 could be made from two separate pieces such as the lower and upper portions 1054, 1056, but permanently affixed to one another.

Such an integrated design for the coupler 1050 can further reduce costs of such a system, by reducing the part counts, and reduce manufacturing costs. In use, such as single piece coupler 1050 can be connected to a fixed solar module by hooking the lip 1080 to an upper ridge 18 of a solar module 12, then tilting the coupler 1050 relative to the solar module 12, until the lower protrusion 20 of the frame 13 of the solar module engages the ridge 1062. Then, with the coupler 1050 fit onto one solar module 12, an adjacent solar module 12 can be connected to the coupler 1050 by hooking the corresponding upper protrusion 18 of a solar module 12 into the hook shaped lip 1082 of the coupler 1050, then tilting the solar module 12 downwardly, in the direction of RT of FIG. 2E, until the lower protrusion 20 engages the ridge 64 and is oriented in the position shown in FIG. 2F. As such, such a single piece coupler 1050 can be used without removing the upper portion 156.

Figure 4A:
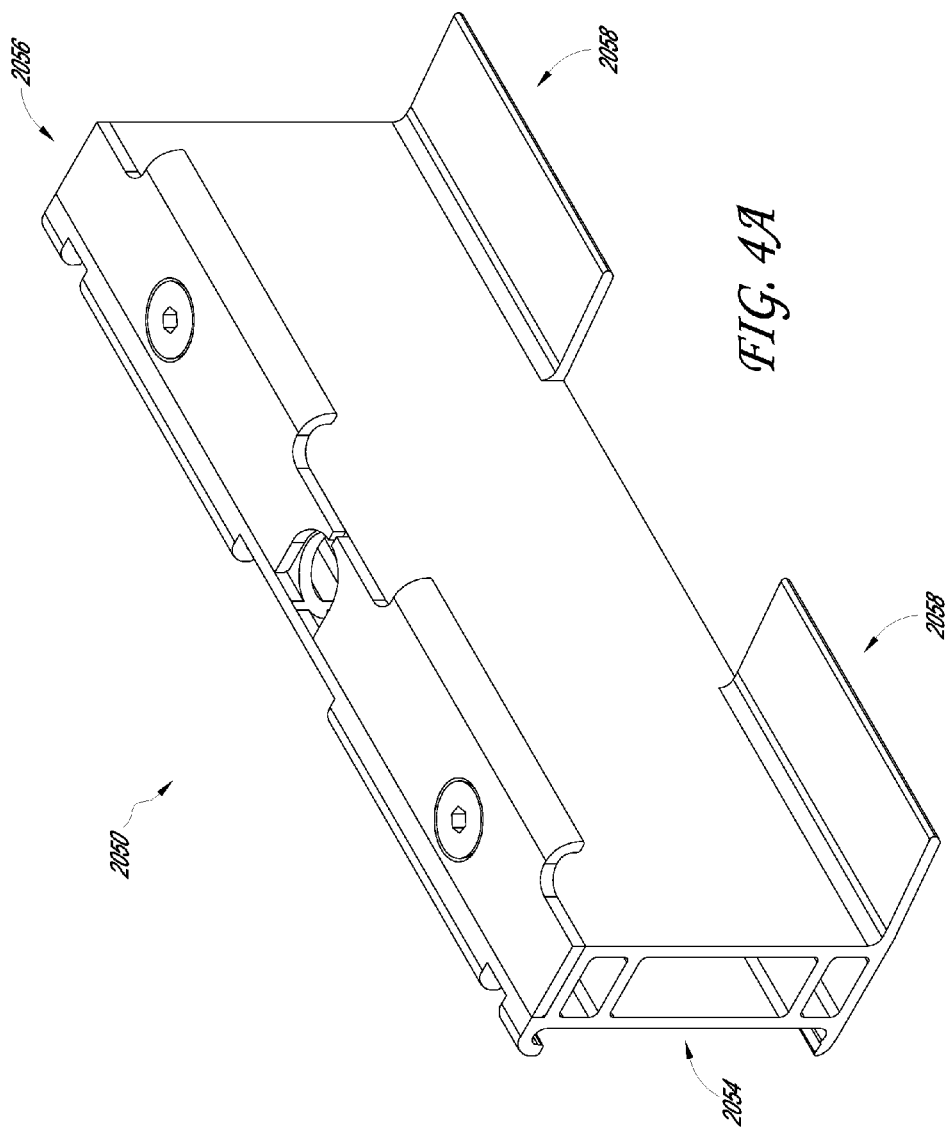
FIG. 4A is a perspective view of a third embodiment of the coupler of FIG. 2A.

FIG. 4A illustrates another embodiment of the coupler 50, identified by the reference numeral 2050. The components of the coupler 2050 that are the same or similar to the couplers 50 or 2050 are identified with the same reference numeral, except that 2000 has been added thereto.

Figure 4B:
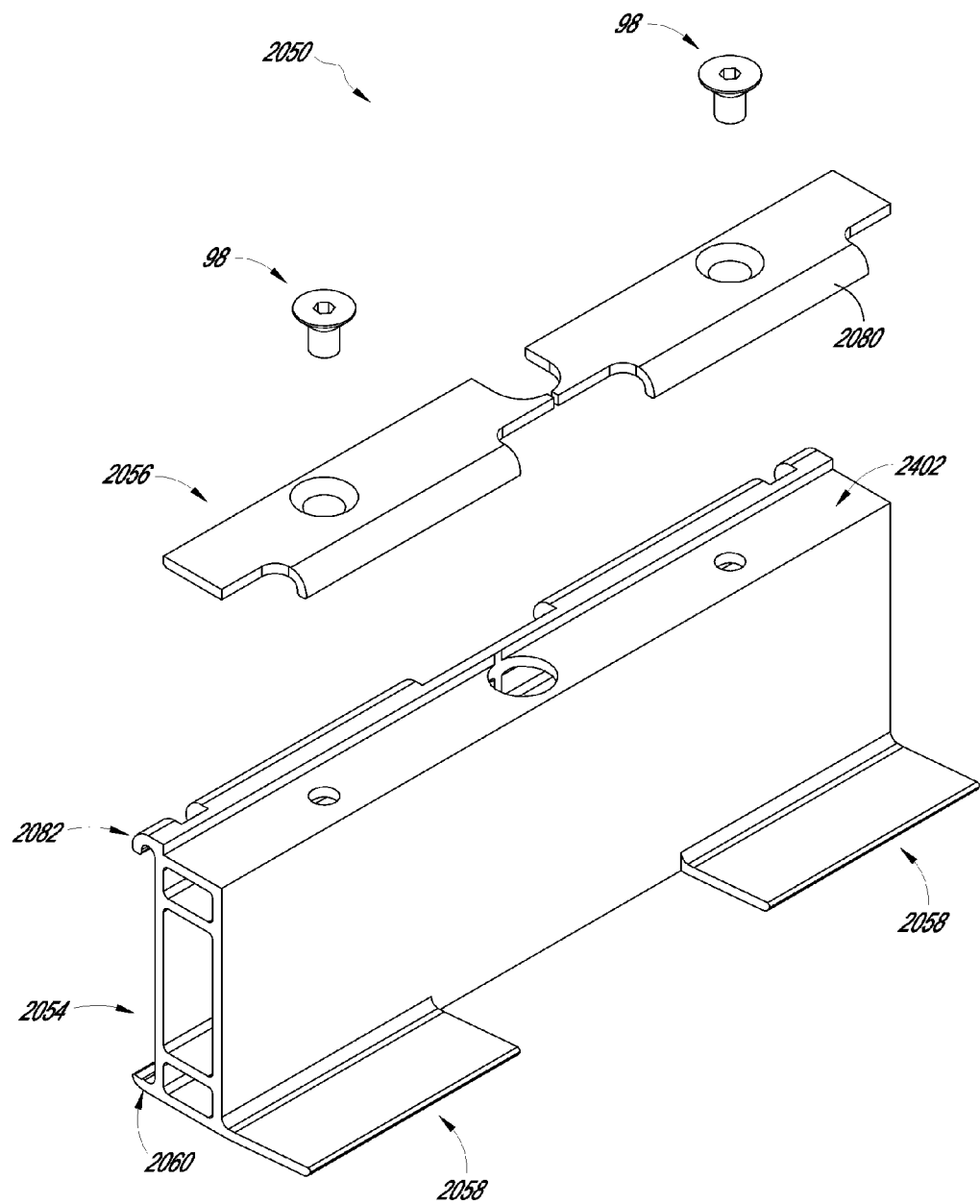
FIG. 4B is an exploded perspective view of the coupler of FIG. 4A.

With reference to FIGS. 4A and 4B, the coupler 2050 can include a lower portion 2054 and an upper portion 2056. In the illustrated embodiment, the lower portion 2054 includes the lip 82 and an upper mounting surface 2402 for receiving the upper portion 2056. Additionally, similarly to the embodiments of FIGS. 2B and 3, the upper portion 2056 can be made from one or more parts.

The upper portion 2056 can include a lip only on one side, in the illustrated embodiment, the lip 2080. The coupler 2050 can be engaged with a solar module 12 by hooking and tilting the coupler relative to solar module 12 as described above with reference to FIG. 3. Additionally, the coupler 2050 can be connected to and removed from engagement with solar modules by removing the fasteners 98 and the upper portion 2056. As such, the upper portion 2056 can be removed while the other side of the coupler 2050, including the upper lip 82 can remain engaged with a solar module, thereby maintaining the coupler 2050 in its position.

This can provide a further advantage when using the coupler 2050 in an array 11, and in particular, when removing and reinstalling the solar module from an array in which the solar module is surrounded by other modules. Thus, when the upper portion 2056 is removed, so as to allow a solar module to be removed from the array, the coupler 2050 can remain securely engaged with an adjacent solar module because the lip 2082 remains fixed relative to the lower lip 2060. Thus, the solar module 12 which is removed and/or reinstalled can rest against the lower lips 2058 of the coupler 2050, during the reinstallation process.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A height-adjustable roof anchor for solar modules, the roof anchor comprising:
    a base having a hole therein, the hole comprising an inner wall;
    a height adjustment member having an upper portion configured to engage at least one solar module with a brace, the height adjustment member extending from the hole of the base and upwardly away from the base, the height adjustment member having an annular groove formed around the circumference of the rod, the annular groove positioned within the hole;
    a locking portion engaging the annular groove so as to retain the height adjustment member in the hole and allow the height adjustment member to rotate about a rotational axis, wherein the height adjustment member is configured to adjust a height of the at least one solar module during rotation about the rotational axis;
    a sleeve disposed over the height adjustment member and configured to be disposed through an opening in the brace; and
    an anti-rotation portion to prevent relative rotation between the sleeve and the brace.

2. The roof anchor of claim 1, wherein the height adjustment member comprises a rod with a threaded portion and a non-threaded portion, the annular groove formed in the non-threaded portion.

3. The roof anchor of claim 2, wherein the threaded portion of the rod extends out of the hole, and wherein at least part of the non-threaded portion is positioned within the hole.

4. The roof anchor of claim 3, the non-threaded portion comprising a plurality of annular grooves formed around the circumference of the rod and the inner wall comprising a plurality of locking portions, each locking portion extending into a corresponding annular groove.

5. The roof anchor of claim 1, wherein the locking portion of the inner wall is swaged into the annular groove.

6. The roof anchor of claim 1, wherein the locking portion of the inner wall is configured to substantially prevent the height adjustment member from being removed from the hole.

7. The roof anchor of claim 6, wherein the locking portion of the inner wall is configured to allow rotation of the height adjustment member about a longitudinal axis of the height adjustment member.

8. The roof anchor of claim 1, wherein the base comprises a mount configured to mechanically couple to a roof and an extruded foot, the hole being formed in the extruded foot.

9. The roof anchor of claim 8, wherein the base is made of aluminum and the height adjustment member is made of steel rod.

10. The roof anchor of claim 8, the mount comprising a slot configured to receive a coupling member for securing the roof anchor to the roof.

11. The roof anchor of claim 1, wherein the sleeve is threaded over a threaded portion of the height adjustment member.

12. The roof anchor of claim 11, wherein the sleeve is configured to positively locate the brace relative to the sleeve, and wherein the sleeve is configured to be removed when a detent or latching mechanism is engaged.

* * * * *